United States Patent
Shen et al.

(10) Patent No.: US 11,036,511 B2
(45) Date of Patent: Jun. 15, 2021

(54) PROCESSING OF A TEMPORARY-REGISTER-USING INSTRUCTION INCLUDING DETERMINING WHETHER TO PROCESS A REGISTER MOVE MICRO-OPERATION FOR TRANSFERRING DATA FROM A FIRST REGISTER FILE TO A SECOND REGISTER FILE BASED ON WHETHER A TEMPORARY VARIABLE IS STILL AVAILABLE IN THE SECOND REGISTER FILE

(71) Applicant: Arm Limited, Cambridge (GB)

(72) Inventors: Xiaoyang Shen, Alpes-Maritimes (FR); Damien Robin Martin, Alpes-Maritimes (FR); Cédric Denis Robert Airaud, Saint Laurent du Var (FR); Luca Nassi, Antibes (FR); François Donati, Antibes (FR)

(73) Assignee: Arm Limited, Cambridge (GB)

( * ) Notice: Subject to any disclaimer, the term of this patent is extended or adjusted under 35 U.S.C. 154(b) by 99 days.

(21) Appl. No.: 16/524,667

(22) Filed: Jul. 29, 2019

(65) Prior Publication Data
US 2020/0065109 A1 Feb. 27, 2020

(30) Foreign Application Priority Data
Aug. 24, 2018 (GB) .................... 1813868

(51) Int. Cl.
*G06F 9/30* (2018.01)
*G06F 9/38* (2018.01)
(Continued)

(52) U.S. Cl.
CPC .......... *G06F 9/30181* (2013.01); *G06F 9/226* (2013.01); *G06F 9/30036* (2013.01);
(Continued)

(58) Field of Classification Search
CPC .. G06F 9/30181; G06F 9/3824; G06F 9/3826; G06F 9/30123; G06F 9/3555;
(Continued)

(56) References Cited

U.S. PATENT DOCUMENTS

| 5,222,240 A | 6/1993 | Patel | |
| 6,189,094 B1 * | 2/2001 | Hinds | G06F 9/3838 |
| | | | 712/222 |

(Continued)

FOREIGN PATENT DOCUMENTS

| GB | 2 302 190 | 1/1997 |
| GB | 2 490 033 | 10/2012 |
| JP | 2010-67141 | 3/2010 |
| WO | 03/036468 | 5/2003 |

OTHER PUBLICATIONS

Combined Search and Examination Report for GB 1813868.5 dated Feb. 21, 2019, 5 pages.

*Primary Examiner* — Shawn Doman
(74) *Attorney, Agent, or Firm* — Nixon & Vanderhye P.C.

(57) ABSTRACT

An apparatus has a processing pipeline, and first and second register files. A temporary-register-using instruction is supported which controls the pipeline to perform an operation using a temporary variable derived from an operand stored in the first register file. In response to the instruction, when a predetermined condition is not satisfied, the pipeline processes at least one register move micro-operation to transfer data from the at least one source register of the first register file to at least one newly allocated temporary register of the second register file. When the condition is satisfied, the operation can be performed using a temporary variable already stored in the temporary register of the second register file used by an earlier temporary-register-using instruction specifying the same source register for (Continued)

determining the temporary variable, in the absence of an intervening instruction for rewriting the source register.

19 Claims, 6 Drawing Sheets

(51) Int. Cl.
  *G06F 9/355* (2018.01)
  *G06F 9/22* (2006.01)
(52) U.S. Cl.
  CPC ...... *G06F 9/30043* (2013.01); *G06F 9/30101* (2013.01); *G06F 9/30123* (2013.01); *G06F 9/30196* (2013.01); *G06F 9/3555* (2013.01); *G06F 9/3824* (2013.01); *G06F 9/3826* (2013.01)
(58) Field of Classification Search
  CPC ............ G06F 9/30043; G06F 9/30101; G06F 9/30196; G06F 9/226; G06F 9/30036; G06F 9/384; G06F 9/30145; G06F 9/3013; G06F 9/30032; G06F 9/30116
  USPC .................................................. 712/23, 226
  See application file for complete search history.

(56) References Cited

U.S. PATENT DOCUMENTS

| | | | | |
|---|---|---|---|---|
| 7,774,583 | B1* | 8/2010 | Gupta | G06F 9/30141 712/218 |
| 2005/0283588 | A1* | 12/2005 | Yamashita | G06F 9/3824 712/217 |
| 2009/0106527 | A1* | 4/2009 | Luick | G06F 9/30036 712/7 |
| 2011/0264892 | A1* | 10/2011 | Nakashima | G06F 9/30134 712/205 |
| 2014/0189324 | A1* | 7/2014 | Combs | G06F 9/30167 712/225 |
| 2014/0281432 | A1* | 9/2014 | Anderson | G06F 9/384 712/226 |
| 2015/0095623 | A1* | 4/2015 | Ermolaev | G06F 9/3004 712/222 |
| 2016/0179545 | A1* | 6/2016 | Garifullin | G06F 9/30181 712/205 |
| 2016/0350115 | A1* | 12/2016 | Tonnerre | G06F 9/384 |
| 2017/0060579 | A1* | 3/2017 | Vincent | G06F 9/322 |
| 2017/0185410 | A1* | 6/2017 | Abernathy | G06F 9/384 |
| 2019/0129718 | A1* | 5/2019 | Chen | G06F 7/57 |
| 2020/0004536 | A1* | 1/2020 | Shevgoor | G06F 9/3861 |

* cited by examiner

PROCESSING OF A TEMPORARY-REGISTER-USING INSTRUCTION INCLUDING DETERMINING WHETHER TO PROCESS A REGISTER MOVE MICRO-OPERATION FOR TRANSFERRING DATA FROM A FIRST REGISTER FILE TO A SECOND REGISTER FILE BASED ON WHETHER A TEMPORARY VARIABLE IS STILL AVAILABLE IN THE SECOND REGISTER FILE

This application claims priority to GB 1813868.5 filed Aug. 24, 2018, the entire contents of which is hereby incorporated by reference.

The present technique relates to the field of data processing.

A data processing apparatus, such as a microprocessor, may have a processing pipeline for performing data processing operations in response to micro-operations generated based on decoding of instructions. Some instructions may be decoded into a single micro-operation, while other instructions may be split into multiple separate micro-operations which can then separately be scheduled by the pipeline for execution.

In some pipeline designs, the pipeline may be provided with a first register file and a second register file. For example different register files could be provided for storing different types of operands for access when processing micro-operations. Some types of instructions may require a register move micro-operation to be performed to move data from one of the register files to the other.

At least some examples provide an apparatus comprising a processing pipeline to perform data processing operations in response to micro-operations generated based on decoding of instructions; a first register file; and a second register file; in which: in response to a temporary-register-using instruction for controlling the processing pipeline to perform at least one operation using a temporary variable derived from at least one operand stored in at least one source register of the first register file, the processing pipeline is configured to: detect whether a predetermined condition is satisfied, the predetermined condition comprising the temporary-register-using instruction being detected as following an earlier temporary-register-using instruction specifying the same at least one source register for determining the temporary variable, in the absence of an intervening instruction for rewriting the at least one source register of the first register file, when the temporary variable for the earlier temporary-register-using instruction is still available in at least one temporary register of the second register file; when the predetermined condition is detected to be not satisfied, process at least one register move micro-operation to transfer data from the at least one source register of the first register file to at least one newly allocated temporary register of the second register file; and when the predetermined condition is detected to be satisfied, perform the at least one operation using the temporary variable stored in the at least one temporary register used for the earlier temporary-register-using instruction.

At least some examples provide an apparatus comprising: means for performing data processing operations in response to micro-operations generated based on decoding of instructions; first register file means for storing data; and second register file means for storing data; in which: in response to a temporary-register-using instruction for controlling the means for performing data processing operations to perform at least one operation using a temporary variable derived from at least one operand stored in at least one source register of the first register file means, the means for performing data processing operations is configured to: detect whether a predetermined condition is satisfied, the predetermined condition comprising the temporary-register-using instruction being detected as following an earlier temporary-register-using instruction specifying the same at least one source register for determining the temporary variable, in the absence of an intervening instruction for rewriting the at least one source register of the first register file, when the temporary variable for the earlier temporary-register-using instruction is still available in at least one temporary register of the second register file; when the predetermined condition is detected to be not satisfied, process at least one register move micro-operation to transfer data from the at least one source register of the first register file to at least one newly allocated temporary register of the second register file; and when the predetermined condition is detected to be satisfied, perform the at least one operation using the temporary variable stored in the at least one temporary register used for the earlier temporary-register-using instruction.

At least some examples provide a data processing method comprising: in response to a temporary-register-using instruction for controlling a processing pipeline to perform at least one operation using a temporary variable derived from at least one operand stored in at least one source register of a first register file: detecting whether a predetermined condition is satisfied, the predetermined condition comprising the temporary-register-using instruction being detected as following an earlier temporary-register-using instruction specifying the same at least one source register for determining the temporary variable, in the absence of an intervening instruction for rewriting the at least one source register of the first register file, when the temporary variable for the earlier temporary-register-using instruction is still available in at least one temporary register of a second register file; when the predetermined condition is detected to be not satisfied, processing at least one register move micro-operation to transfer data from the at least one source register of the first register file to at least one newly allocated temporary register of the second register file; and when the predetermined condition is detected to be satisfied, performing the at least one operation using the temporary variable stored in the at least one temporary register used for the earlier temporary-register-using instruction.

Further aspects, features and advantages of the present technique will be apparent from the following description of examples, which is to be read in conjunction with the accompanying drawings, in which:

FIG. 1 schematically illustrates an example of a data processing apparatus;

Figure 1:
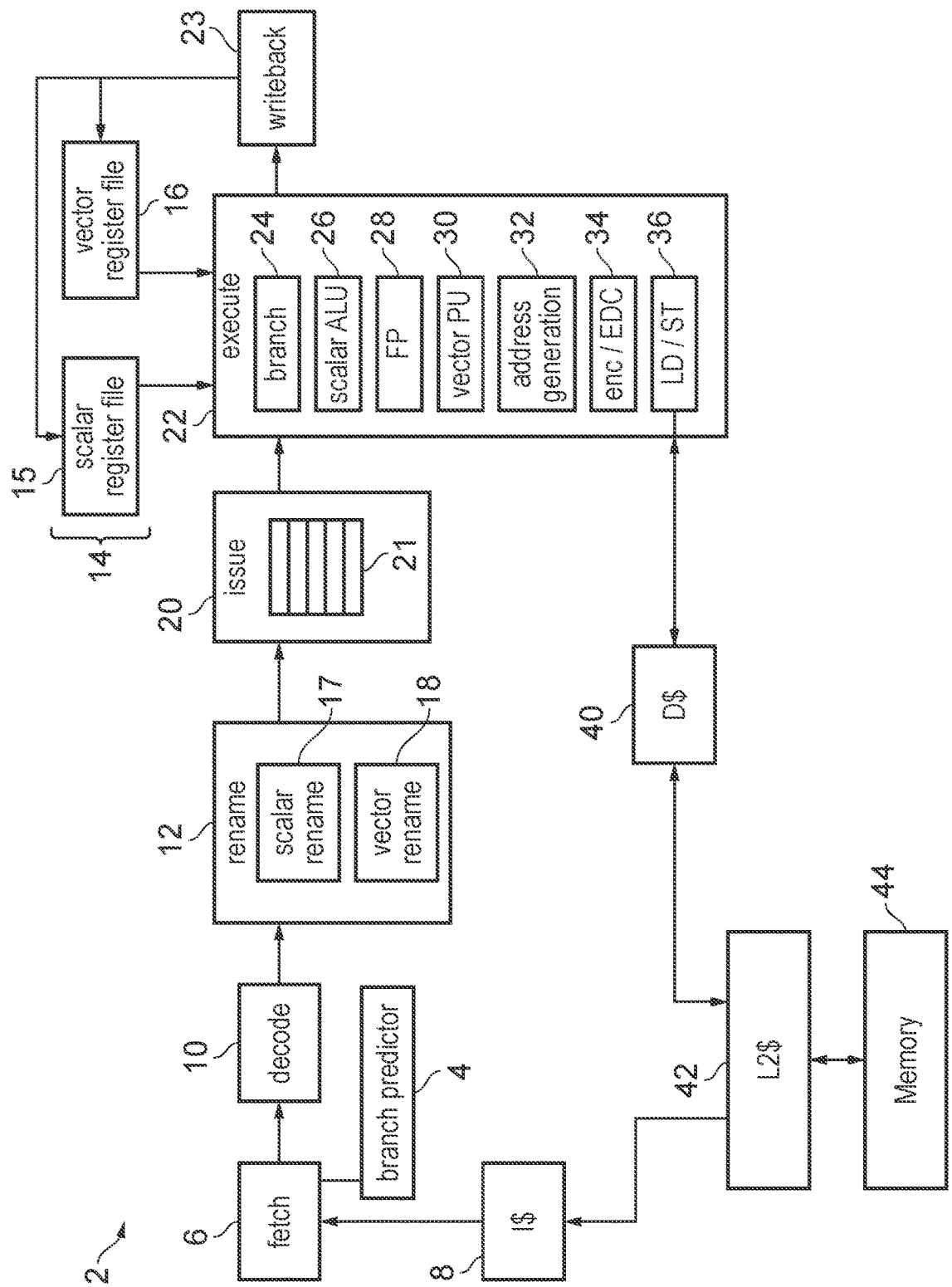

A processing pipeline may support a type of instruction (referred to in this application as a "temporary-register-using instruction") which controls the processing pipeline to perform a processing operation using a temporary variable which is derived from at least one operand stored in the at least one source register of a first register file. However, in order to perform the operation the at least one operand may need to be transferred to a temporary register of a second register file. Hence, the temporary-register-using instruction may be mapped to a number of micro-operations by the processing pipeline, which may include at least one register move micro-operation to transfer data from the at least one source register of the first register file to at least one temporary register of the second register file.

In a conventional approach, a new temporary register would be newly allocated each time an instruction of the temporary-register-using type is identified, and another register move micro-operation (or multiple register move micro-operations) may be performed for each instruction of this type, to move the relevant data to the newly allocated temporary register so that the operation can then be performed using the temporary variable. However, the inventors recognised that for some temporary-register-using instructions, this can result in a significant number of additional register move operations being performed. These register move micro-operations may occupy slots in the issue queue and the execute units which could lead to the pipeline stalling if there are not enough slots to handle other operations. Also, such register move micro-operations occupy bandwidth in the data transfer path between the two register files, which may consume power. Also, the allocation of temporary registers in the second register file for each temporary-register-using instruction may increase the pressure on available registers, which in systems supporting register renaming can affect performance because once there are no longer enough registers available for reallocation then this may cause a stall of the pipeline.

The inventors recognised that in some processing workloads it can be relatively common for multiple instructions of the temporary-register-using type to each specify the same source register as the at least one source register of the first register file whose operand is used to derive the temporary variable. Hence, when a given temporary-register-using instruction is encountered it is possible that the temporary variable required by that instruction may already be present within the second register file and so may not need to be transferred again. This may allow some unnecessary register move micro-operations to be suppressed to save power and improve performance.

Hence, in response to a temporary-register-using instruction, the processing pipeline may detect whether a predetermined condition is satisfied. The predetermined condition may be that the temporary-register-using instruction is detected as following an earlier temporary-register-using instruction specifying the same at least one source register for determining the temporary variable, in the absence of an intervening instruction for rewriting the at least one source vector register in the first register file, when the temporary variable for the earlier temporary-register-using instruction is still available in at least one temporary register of the second register file.

When the predetermined condition is detected to be not satisfied, the processing pipeline may process at least one register move micro-operation to transfer data from the at least one source register file to at least one newly allocated temporary register of the second register file. Conversely, when the predetermined condition is detected to be satisfied, the processing pipeline may perform the at least one operation using the temporary variable stored in the at least one temporary register used for the earlier temporary-register-using instruction.

Hence, by performing the operation using the temporary variable already stored in the second register file following an earlier instruction, this can make it unnecessary to perform another register move micro-operation for the later temporary-register-using instruction. While the logic for determining whether the predetermined condition is satisfied may incur some additional circuit area and power, the power consumed by the extra logic may be lower than the power that would be consumed by redundant register move micro-operations in consuming unnecessary register transfer bandwidth, and so overall power can be saved with this technique. Also, performance can be improved since slots in an issue queue or execute unit that would otherwise be needed to process the register move micro-operation can now be used for other operations to improve processing throughput.

In response to the temporary-register-using instruction, the processing pipeline may suppress processing of the at least one register move micro-operation when the predetermined condition is detected to be satisfied. In other words, processing of the at least one register move micro-operation may be omitted when the predetermined condition is detected to be satisfied.

This technique can be applied to any data processing system having two or more register files. However, it can be particularly useful for systems which comprise a scalar register file having scalar registers for storing scalar operands and a vector register file comprising vector registers for storing operands. One of the first and second register files may be the scalar register file and the other of the first and second register files may be the vector register file (either way round). In some micro-architectural implementations of processors having both scalar and vector registers, the physical positions of the scalar and vector register files on the chip may be relatively far apart, especially for higher performance processor cores where there may be a relatively large number of registers. While most instructions may use only scalar operands or only vector operands, there may be a small number of instructions which use a mix of scalar and vector operands. If the scalar and vector register files are a relatively long distance apart on the chip layout, then it may not be efficient for a single instruction or micro-operation to be able to directly access both the scalar and vector register files, because the relatively long processing delays associated with accessing register files could make such instructions or micro-operations difficult to implement while satisfying timing requirements of the pipeline. Therefore, in instructions which use a mix of scalar and vector inputs, it may be relatively common for data to be transferred from one of the scalar and vector register files to the other so that the corresponding arithmetic or logical operations to be performed in response to a given instruction are carried out on operands stored in the same register file. Hence, some mixed scalar/vector instructions may be decomposed into a number of micro-operations including at least one register move micro-operation. The technique discussed above can allow such register move micro-operations to be eliminated.

This technique can be particularly useful when the scalar and vector register files use separate rename engines. Hence, the apparatus may have scalar register renaming circuitry to map architectural scalar register specifiers specified by the instructions to physical scalar register specifiers directly identifying the scalar registers of the scalar register file, and vector register renaming circuitry separate from the scalar register renaming circuitry, for mapping architectural vector register specifiers specified by the instructions to physical vector register specifiers directly identifying vector registers of the vector register file. In a system with separate rename engines for the scalar and vector register files it is more common that certain processing units may be restricted to accessing only one of the register files and so it is more likely that there may be register move micro-operations provided for temporarily transferring data between one register file and another, which could be eliminated using the technique discussed above.

More generally, the processing pipeline may have register renaming circuitry for mapping architectural register specifiers specified by the instructions to physical register specifiers directly identifying the registers. The register renaming circuitry as a whole may include the separate scalar and vector register renaming components as discussed above. The temporary register of the second register file, which is used by the temporary-register-using instruction, may be a register which is not currently mapped to any architectural register specifier specifiable by the instructions being decoded. Hence, the temporary register may be a register which is allocated temporarily in the second register file solely for accommodating the data transferred from the first register file, rather than being any register which is allocated to store the actual architectural state associated with a given architectural register specifier. Normally such temporary registers would be assumed to only be needed for a single instruction and then once all the micro-operations associated with that instruction are complete then that temporary register could be reallocated to store other data. However, with the technique discussed in this application such temporary registers may be retained and if still storing the relevant temporary variable at the time when a later temporary-register-using instruction is encountered which requires the same temporary variable, then this temporary register can be reused and there is no need to allocate another temporary register or perform a separate register move micro-operation for the later instruction.

The detection of whether the predetermined condition is satisfied for a given temporary-register-using instruction may be carried out at different points of the processing pipeline. For example, in one implementation the decode stage of the pipeline which decodes the instructions into micro-operations could detect whether the predetermined condition is satisfied and could determine whether or not to generate the at least one register move micro-operation in the first place based on whether the predetermined condition is detected to be satisfied.

However, in other examples the register renaming circuitry of the processing pipeline may detect whether the predetermined condition is satisfied. It may be more efficient to implement the detection of whether the condition is satisfied at the rename stage of the pipeline because whether the predetermined condition is satisfied may depend on status information recorded for particular registers, which tracks whether there has been any intervening instruction for rewriting the corresponding at least one source vector register, or whether the contents of a temporary register can be used for a subsequently encountered temporary-register-using instruction. Often the rename stage may already maintain state information for registers and so it may be simpler to extend the per-register state information recorded by the register renaming circuitry to also include tracking of the information for determining whether the predetermined condition is satisfied.

Hence, in implementations where the register renaming circuitry performs the detection of the predetermined condition, the register renaming circuitry may need to determine whether a given register move micro-operation encountered at the register rename stage was generated in response to a temporary-register-using instruction which specifies a source operand in the first register file as discussed above, or has been generated in response to some other instruction by the decode stage of the processing pipeline. Not all register move micro-operations may be triggered by a type of instruction which would involve use of a temporary register. The processing pipeline may have decode circuitry for decoding the instructions to generate the micro-operations. To enable the relevant register move micro-operations to be distinguished, the decode circuitry may tag a register move micro-operation generated in response to the temporary-register-using instruction with a tag indication, to distinguish it from a register move micro-operation generating response to another type of instruction. For example, the tag indication could be an indicator which passes along the pipeline with the micro-operation, or a separate record of micro-operation identifiers which identify the tagged micro-operations. When the register renaming circuitry encounters a register move micro-operation tagged with a tag indication, the register renaming circuitry may detect whether the predetermined condition is satisfied, and suppress processing of the at least one register move micro-operation when the predetermined condition is detected to be satisfied. On the other hand, for register move micro-operations not tagged with the tag indication, the register renaming circuitry may allow the untagged register move micro-operation to proceed regardless of whether the predetermined condition is satisfied.

The temporary registers used to temporarily accommodate data transferred from the first register file may be implemented in different ways in the second register file. In some examples the temporary registers of the second register file could simply be the general registers of the second register file which could also be mapped to architectural register specifiers. Hence, the register renaming circuitry associated with the second register file may not have a fixed partition between temporary registers and mapped registers associated with the particular architectural register specifiers. Instead, over time a given physical register could sometimes be used as a temporary register and other times used as a mapped architectural register.

With this approach, when the at least one register move micro-operation is processed in the case when the predetermined condition is not satisfied, the data may be transferred from at least one source register of the first register file to the at least one temporary register of the second register file. Following this processing, the register renaming circuitry may protect the at least one temporary register from being remapped to a new architectural register specifier for a period after processing the at least one register move micro-operation. The protection period may have a longer duration than a duration taken to complete processing of any micro-operations associated with the temporary-register-using instruction. Normally, in register renaming based systems once all the micro-operations associated with a given temporary-register-using instruction have completed, then the temporary register used by that instruction may be released for allocation to a different architectural register. However, to increase the chance that a subsequent temporary-register-using instruction may reuse the temporary register already allocated by an earlier temporary-register-using instruction, the register renaming circuitry may protect the at least one temporary register from remapping for an additional period beyond the completion of the processing of any micro-operations associated with the temporary-register-using instruction itself.

For example, the register rename circuitry could start a counter, either when the temporary register is allocated in the first place, or on completion of the micro-operations associated with the temporary-register-using instruction, and when the counter expires then the temporary register may be released for remapping. The counter may be reset when, in response to a given temporary-register-using instruction, it is determined that the predetermined condition is detected to be satisfied and so the temporary register of the earlier instruction is used for micro-operations for a later instruction, to prolong the time that the temporary register used by that temporary-register-using instruction is preserved in the register file.

Hence, by protecting the temporary register for a period this increases the opportunities for sharing of temporary variables between different temporary-register-using instructions. Nevertheless, by bounding the length of time for which the temporary register is protected, this means that eventually the temporary register can be reclaimed to deal with the register pressure required for maintaining performance. In some examples, the most likely instructions to share the same value of the temporary variable will be the instructions executed soon after the previous temporary-register-using instruction so that the probability of the temporary variable being reused will tend to decrease over time.

In other examples, rather than using a counter to bound the time for which the temporary register is protected from remapping, the register renaming circuitry could detect "clues" in the instructions/micro-operations being processed to detect whether it is worth preserving the temporary register. If it is expected that there is not excessive register usage pressure in the second register file (e.g. during some vectorised processing algorithms there may not be many instructions that require scalar registers), and the stream of micro-operations encountered indicates clues that indicate the high probability of the existence of a second temporary-register-using instruction specifying the same source register as an earlier temporary-register-using instruction, then the register renaming circuitry may choose to continue to protect the temporary register from remapping. For example, when a gather-load instruction is encountered, it is often relatively probable that there will later be a scatter-store instruction which specifies the same source vector register as the gather-load for defining the address offsets, so an option may be to protect the temporary register(s) used for the gather-load instruction until the corresponding scatter-store instruction is encountered, unless there is any other reason for reclaiming the temporary register (such as encountering a gather-load or scatter-store specifying a different source register, or running out of enough registers in the second register file to handle other instructions).

In an alternative implementation, the second register file could comprise at least one reserved temporary register which is reserved for storing data transferred from the first register file in response to a temporary-register-using instruction and which cannot be mapped to any particular architectural register specifier. In this case, a fixed partition may be provided between the physical registers used as temporary registers and the physical registers mapped to architectural registers. With this approach it may not be necessary to perform any specific action for protecting the reserved temporary registers from being remapped to a different architectural register specifier. The time for which a given temporary variable remains resident within the second register file may depend on how long it takes before all of the temporary registers have been used and so for the next temporary-register-using instruction that cannot make use of an already allocated temporary register, a previously allocated temporary register may need to be reallocated.

The technique discussed above can be used for any instruction which involves use of a temporary register for accommodating data transferred from the first register file, particularly where the temporary register is not a register mapped to any particular architectural register specifier. However, this technique is particularly useful in cases where there is at least one calculation unit which is capable of performing a calculation based on an operand stored in the second register file but incapable of performing a calculation based on an operand stored in the first register file. Hence, in some cases the temporary-register-using instruction may comprise an instruction for which a calculation is required to be performed by the at least one calculation unit but based on an operand which is currently specified in the at least one source register of the first register file. In this case, to be able to perform the calculation the operand will need to be transferred to the first register file using a register move micro-operation before the calculation unit can perform its operation.

For example the at least one calculation unit may comprise an address calculation unit to calculate addresses for data access operations based on one or more operands stored in the second register file. For example, some systems supporting scalar and vector register files may only permit the address calculation unit to calculate addresses based on operands stored in the scalar register file. There may be relatively few instructions which require addresses to be computed based on operands in the vector register file and so the system designer may have decided that the extra logic and circuit wiring required to enable direct access from the address calculation unit to the vector register file may not be justified. In such a system, instructions which do require an address to be computed based on an operand stored in the vector register file would require a register move micro-operation to transfer data from the vector register file to the scalar register file. Some such instructions may require two or more register move micro-operations. As it can be relatively common for several program instructions to share the same source operand used to calculate addresses (such as a common base address or common offset), there can be a reasonably high percentage of such temporary-register-using instructions which could benefit from unnecessary register move micro-operations being omitted from processing using the technique discussed above.

Another example can be where the at least one calculation unit may comprise an encryption unit to perform an encryption operation on an operand stored in the second register file and/or an error detecting code calculating unit to calculate an error detection code based on an operand stored in the second register file. Again, to limit circuit implementation costs the encryption unit or error detection code calculating unit may be restricted to applying its operation to operands in the second register file and so if this functionality is needed for an operand currently in the first register file then the corresponding program instruction may be mapped to a set of micro-operations including at least one register move micro-operation, and so if different instructions share the same source operand in the first register file then the register move micro-operations can omitted from being processed for the second of those instructions.

In one example where the first and second register files are the vector and scalar register files respectively, the temporary-register-using instruction may comprise a data access instruction for controlling the processing pipeline to access data from a memory system according to at least one address which depends on a source vector operand stored in a source vector register specified by the temporary-register-using instruction.

This technique can be particularly useful if the data access instruction comprises a gather-load instruction or a scatter-store instruction for controlling the processing pipeline to process data access operations to two or more different addresses in memory, with each data access operation having its address depending on a respective data element of the source vector operand of the data access instruction. Such instructions can require two or more different data transfers between the scalar and vector register files. Hence, if the at least one source operand used to compute the addresses is the same for multiple gather-load or multiple scatter-store instructions, the corresponding register move operations triggered by such an instruction may be eliminated to save a significant amount of register transfer bandwidth and slots in the issue queue or execute stage. In some examples, each data element of the source vector operand for a gather-load or scatter-store instruction may specify a base address, which is to be combined with an offset specified by a scalar operand or an immediate operand to form the corresponding address of a given data access operation, where the scalar operand or the immediate operand is the same for each of the data access operations. Alternatively, each data element may specify an offset, which is to be combined with a base address specified in a scalar operand to form the address of the corresponding data access operation, where the scalar operand is the same for each of the data access operations. It has been found that with some processing benchmarks nearly 50% of gather-load instructions or scatter-store instructions may benefit from the technique discussed above as they share the same source operands for defining the address in the vector register file and so can benefit from the elimination of unnecessary register move micro-operations.

The temporary-register-using instruction may be any type of instruction which controls the processing pipeline to perform an operation using a temporary variable stored in a temporary register of the second register file, which is derived from an operand stored in a source register of the first register file. Note that the temporary-register-using instruction itself does not need to specify the temporary register to be used—the source and destination registers specified by the temporary-register-using instruction may all be architectural registers. Hence, there may be nothing in the encoding of the instruction itself that identifies that a temporary register may be used. The temporary-register-using instruction may simply be any instruction which the micro-architectural implementation handles using a temporary register of the second register file in the way discussed above.

FIG. 1 schematically illustrates an example of a data processing apparatus 2 having a processing pipeline comprising a number of pipeline stages. The pipeline includes a branch predictor 4 for predicting outcomes of branch instructions. A fetch stage 6 generates a series of fetch addresses based on the predictions made by the branch predictor 4. The fetch stage 6 fetches the instructions identified by the fetch addresses from an instruction cache 8. A decode stage 10 decodes the fetched instructions to generate micro-operations for controlling the subsequent stages of the pipeline. Some instructions may be decoded into a single micro-operation while others may be decoded into two or more micro-operations. A rename stage 12 performs register renaming to map architectural register specifiers identified by the instructions to physical register specifiers identifying registers 14 provided in hardware. The rename stage 12 may include separate scalar and vector rename engines 17, 18 for performing renaming for scalar and vector register files 15, 16 respectively. Register renaming can be useful for supporting out-of-order execution as this can allow hazards between micro-operations specifying the same architectural register to be eliminated by mapping them to different physical registers in the hardware register file, to increase the likelihood that the micro-operations can be executed in a different order from the program order in which the corresponding instructions were fetched from the cache 8, which can improve performance by allowing a later micro-operation to execute while an earlier micro-operation is waiting for an operand to become available. The ability to map architectural registers to different physical registers can also facilitate the rolling back of architectural state in the event of a branch misprediction. An issue stage 16 queues micro-operations awaiting execution in an issue queue 21 until the required operands for processing those micro-operations are available in the registers 14. An execute stage 22 executes the micro-operations to carry out corresponding processing operations. A writeback stage 23 writes results of the executed micro-operations back to the registers 14.

The execute stage 22 may include a number of execution units such as a branch unit 24 for evaluating whether branch operations have been correctly predicted, a scalar ALU (arithmetic logic unit) 26 for performing arithmetic or logical operations on scalar operands stored in the scalar register file 15, and a floating-point unit 28 for performing operations using floating-point operands. A vector processing unit 30 performs vector operations on vector operands stored in the vector register file 30. An address generation unit 32 generates addresses for load/store operations based on scalar operands in the scalar register file 15. A load/store unit 36 performs load operations to load data from a memory system to the registers 14 or store operations to store data from the registers 14 to the memory system. In this example the memory system includes a level one instruction cache 8, a level one data cache 40, a level two cache 42 which is shared between data and instructions, and main memory 44, but it will be appreciated that this is just one example of a possible memory hierarchy and other implementations can have further levels of cache or a different arrangement. The execute stage 22 may also have an encryption unit 34 for performing encryption/decryption operations, and/or an error detection code unit 34 for generating error detecting or correcting codes (codes providing redundancy of encoding which enables detection/correction of random errors occurring due to hardware faults). It will be appreciated that the pipeline shown in FIG. 1 is just one example and other examples may have different sets of pipeline stages or execution units.

FIG. 1 shows the logical flow of signals between different parts of the processing system, but it will be appreciated that the physical layout of the circuit components for the various elements of the apparatus may be different. For example, the vector register file 16 may be physically remote from the scalar register file 15.

In practice, most instructions which require computation of an address using the address generation unit 32 use scalar operands to define the address. Instructions for which the address depends on a vector operand in the vector register file 16 are less common. Hence, in practice the address generation unit 32 may be positioned closer to the scalar register file 15 and there may not be any circuit wiring directly connecting the address generation unit to the vector register file 16. This means that for instructions which require an address to be computed based on a vector operand, a register move micro-operation may be required to move the relevant data from the vector register file 16 to the scalar register file 15 before the address generation unit 32 can perform its address computation.

Figure 2:
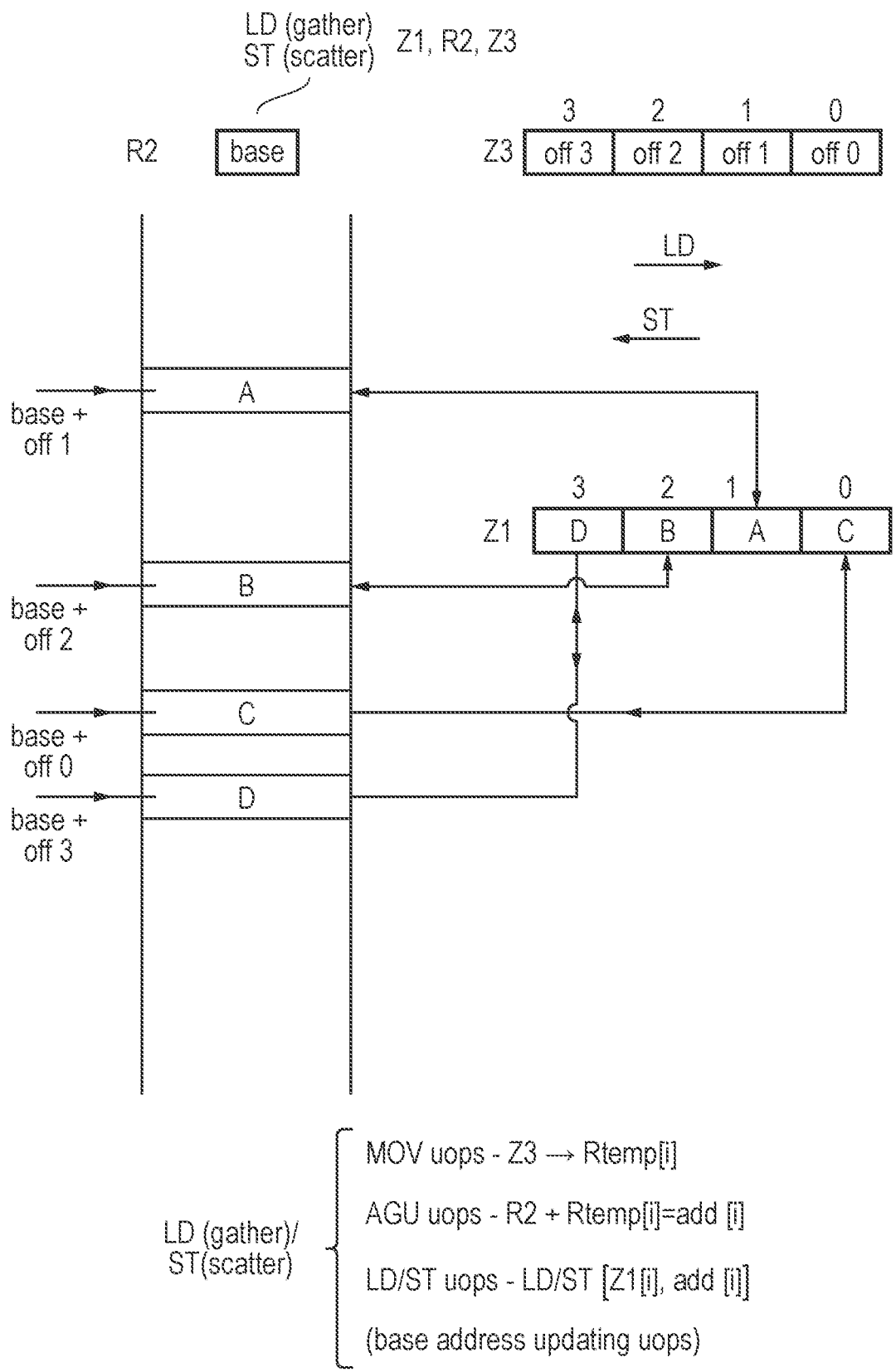
FIG. 2 shows an example of gather load or scatter store instructions.

FIG. 2 shows an example of instructions which may require an address to be computed based on a vector operand. FIG. 2 shows an example of a gather-load instruction or a scatter-store instruction which specifies a vector register Z1 to which data is to be loaded from memory (for a load instruction) or from which data is to be stored to memory (for a store instruction). The instruction also specifies a scalar register R2 and a further vector register Z3, where the addresses of two or more data access operations to be triggered by the gather load of scatter store instruction are to be determined based on the registers Z2 and Z3. In this example the scalar register R2 specifies a base address and the vector register Z3 specifies a vector of offset values, where each of the addresses for the respective data access operations is determined by adding a respective offset from Z3 to the base address in R2. For example, the data value to be loaded into element 0 of register Z1 in response to a gather load instruction may be obtained from a location in memory whose address is determined by adding offset 0 (read from element 0 of vector register Z3) to the base address in register R2. Similarly for the other data elements of the destination register Z1, the respective data values loaded have addresses identified by adding the other offsets specified in the remaining data elements of register Z3 to the base address. Similarly, for a store operation the address computation is the same as for a load, but data already stored in register Z1 may be stored to memory at the corresponding address locations.

Unlike for a contiguous load/store instruction, with gather/scatter instructions, the addresses of the respective data access operations may be non-contiguous in the address space. Also it is not essential for the offsets to be ordered sequentially, so it is possible for offset 0 to be either greater than or less than offset 1 for example. It is not essential for a load/store operation to be triggered for every element of the vector register Z1. It is possible for some lanes to be masked out by predication.

While FIG. 2 shows an example where the vector operand Z3 specifies a vector of offsets and the scalar address operand R2 specifies the base address, another option maybe for the data access operations triggered by the gather/scatter operations to compute their addresses based on a vector operand Z3 specifying base addresses in each data element of the vector, and a shared offset to be applied to each of those base addresses being specified in either a scalar register or an immediate operand specified in the encoding of the instruction.

As shown at the bottom of FIG. 2, such gather-load instructions or scatter-store instructions may be decoded by the decode stage 10 into a number of different micro-operations to be performed by the processing pipeline. These may include register move micro-operations for moving data from respective elements of the vector register Z3 in the vector register file 16 into corresponding temporary registers Rtemp[i] within the scalar register file 15, address generation micro-operations for controlling the address generation unit 32 to calculate the addresses of the respective data access operations based on the scalar register R2 and the allocated temporary registers Rtemp[i] which were filled with the data transferred from the vector register file, and the load/store micro-operations themselves which carry out the actual transfer of data between the register Z1 in the vector register file 16 and the respective locations in memory identified by the computed addresses. Optionally, some variants of the gather-load or scatter-store instructions could also include further micro-operations for updating the base address (or base addresses) identified by the address defining operands. For example some forms of load or store instructions may use a pre-operation or post-operation update of the base address, which can help allow the same instruction to be executed in a loop for stepping through a range of addresses, without needing a further instruction to be executed to update the address pointer for the next loop iteration.

The move micro-operations associated with such load/store operations may be relatively costly in terms of performance and power consumption. The subsequent micro-operations for computing the address and performing the load/store operations may be dependent on the move micro-operations and (unless there is support for load speculation) cannot start until the move micro-operation is complete. The move micro-operation may be relatively slow as there may be a relatively long path delay between the vector and scalar register files compared to the delay between the scalar register file and the address generation unit 32 for example. The register transfer operation may also consume bandwidth and activate logic on the vector-scalar register file transfer path which may incur a power cost. Also the register move micro-operations may occupy slots in the issue queue in the issue stage 20 and occupy execution units which could otherwise be used for other instructions. Also, at the rename stage 12 the scalar renaming unit 17 may have to allocate physical registers of the scalar register file 15 as the temporary registers into which the data from the vector register file is moved, which cannot therefore be reused for other operations and cannot be reclaimed until all of the move micro-operations are complete and the corresponding address generation micro-operations have read the relevant temporary registers. This may increase the pressure on registers and may prevent other operations being performed as early.

It has been observed that in practice it is relatively common for gather-load and scatter-store instructions to share the same source registers for the address computation operands, and often there is no intervening instruction between successive gather-load or scatter-store instructions which rewrites the registers used to define the address computation. For example, the offsets specified in register Z3 in FIG. 2 may be the same across multiple instructions, as while the base address in R2 may change, the offsets may be the same each time for example. Hence, often the same values may end up being transferred from the vector register file to the scalar register file multiple times in the move micro-operations triggered for each subsequent load or store instruction.

This can be avoided by providing tracking in the rename stage 12 to enable detection of cases where the gather load or scatter store instruction follows an earlier gather load or scatter store instruction which had the same source vector register Z3, for which there has not yet been any intervening instruction which rewrote that vector register Z3.

Figure 3:
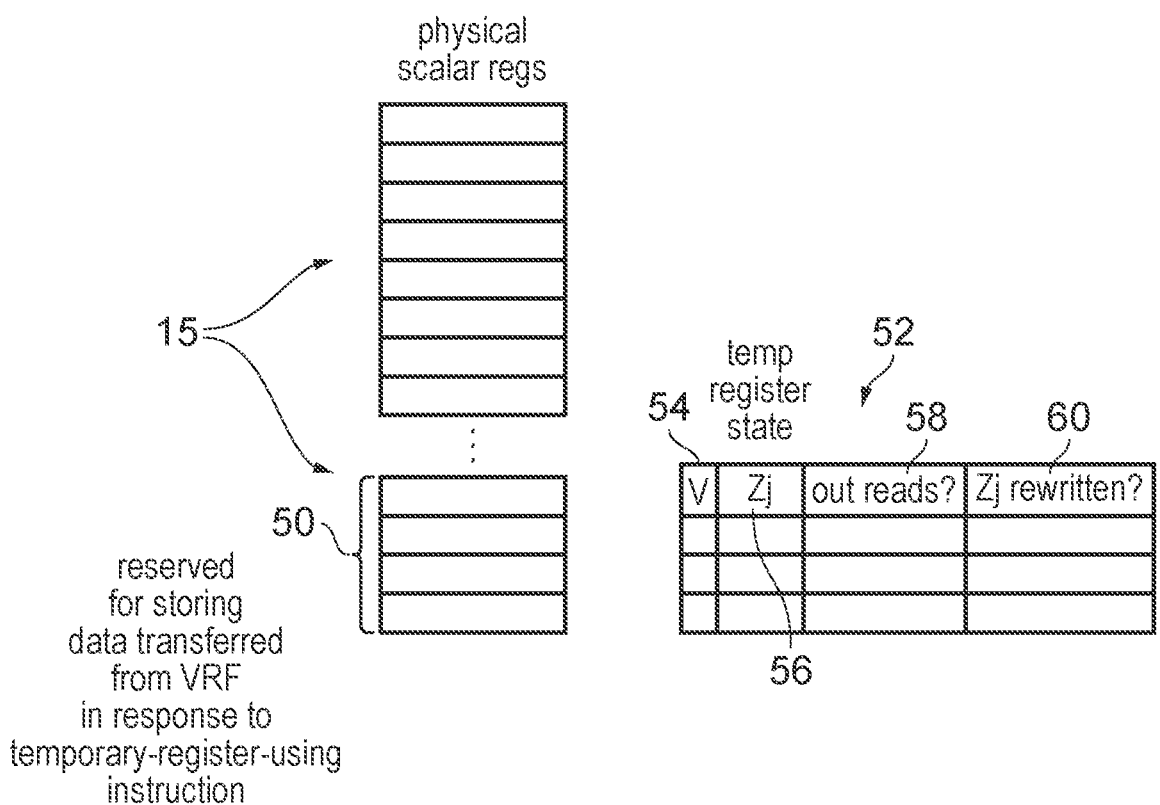
FIG. 3 shows an example in which a subset of scalar registers is reserved for storing data transferred from a vector register file.

For example as shown in FIG. 3, within the scalar register file 15, a portion 50 of the physical registers may be reserved as temporary registers (Rtemp) for accommodating the data transferred from the vector register file 15. For the reserved temporary registers 50, the renaming circuitry 12 may maintain some temporary register state information 52 for tracking whether the temporary registers stored in the temporary registers can be reused across instructions. For example the temporary register state provided for each of the temporary registers 50 may include a valid field 54 specifying whether any valid temporary variable has been written to that register, a source vector register indication 56 which identifies the architectural register number of the source vector register which was specified by the gather-load or scatter-store instruction which caused that temporary register to be allocated, an outstanding read count 58 for tracking whether all of the address generation micro-operations which are required to read the temporary variable stored in the temporary register 50 have been processed, and a source vector register rewrite flag 60 for indicating whether there has been any subsequent instruction which involves a write to the source vector register Z; indicated in the field 56 for the corresponding temporary register 50.

The first time a gather-load or scatter-store instruction is encountered when there has been no previous gather-load or scatter-store instruction, the register move micro-operations required for transferring data from the vector register file to the scalar register file 15 are performed as normal as shown in FIG. 2. At this point any temporary registers in the reserved portion 50 that are used for the data transferred from the vector register file are marked as valid using the valid flag 54 in the temporary register state information 52 and the corresponding vector register fields 56 of the entries for those allocated temporary registers are set to specify which source vector registers the corresponding data was transferred from. The outstanding read field 58 is set to match the number of subsequent address generation micro-operations which will be required to access that temporary register in response to the particular gather-load or scatter-store instruction that triggered the allocation of this temporary register. The source vector register rewrite flag 60 is set to indicate that there has not yet been any subsequent instruction which requires rewriting of the source vector register indicated in field 56.

Each time there is an address generation micro-operation which reads a given temporary register the outstanding read field 58 may be decremented.

If the rename stage 12 encounters an instruction which rewrites the vector register indicated in field 56 for a given temporary register 50, then the corresponding rewrite flag 60 is cleared so as to indicate that the value in the corresponding source vector register may have changed.

When a subsequent gather-load or scatter-store instruction is encountered, then the scalar renaming engine 17 checks whether the temporary register state 52 indicates that there is already a temporary register 50 allocated for the particular source vector register needed for the latest instruction (that is, whether the source vector register specified in the instruction matches any of the source vector registers indicated in fields 56 of the respective entries of the temporary register state 52). If so, then the rename stage 12 checks whether the rewrite field 60 indicates that there has been no instruction for rewriting the corresponding source vector register 56 since the temporary register 50 was allocated. Hence, if there has been no intervening instruction for rewriting the source vector register indicated in field 56 then the contents of the temporary register 50 are still valid and can be reused for the latest gather-load or scatter-store instruction, and it is not necessary to allocate any further temporary registers 50 or to process any of the move micro-operations associated with that gather-load or scatter-store instruction.

To enable the rename stage 12 to distinguish the move micro-operations associated with a gather-load or scatter-store instruction from move micro-operations triggered by other instructions, the decode stage 10 may set a bit flag or other indicator associated with register move micro-operations, to tag which register move micro-operations were triggered by gather-load or scatter-store instructions. The rename stage may check the temporary register state 52 only when a tagged micro-operation is encountered.

If the register move micro-operation can be omitted then the rename stage 12 discards the tagged register move micro-operation from the queue of pending micro-operations, and the discarded micro-operation is not forwarded to the issue stage 20. Also the rename stage may increment the number of outstanding reads field 58 of the entry of the temporary register state 52 corresponding to the relevant temporary register. On the other hand, if either the source register vector specified by given tag move micro-operation does not match any of the source vector registers in the fields 56 of the temporary register state storage 52, or the rewrite flag 60 indicates that the corresponding source vector register may have been rewritten since the temporary register was allocated, then the tagged move micro-operation is still permitted to proceed to subsequent pipeline stages and in this case a new temporary register 50 is allocated for receiving the data received from the vector register file 16 in response to those move micro-operations (with the number of outstanding reads 58 initially set to 1 for the corresponding temporary register).

The scalar rename circuitry 17 may protect temporary registers from being reallocated if there are any reads still outstanding as indicated by the outstanding read count 58. Once the number of outstanding reads is 0, the corresponding temporary register 50 may retain its temporary variable in case a subsequent gather-load or scatter-store instruction can use it, but once sufficient gather-load or scatter-store instructions have been processed that there are no longer any invalid temporary registers as indicated by valid flag 54, then it may be necessary to reallocate a particular temporary register to a new instruction. Nevertheless, by reserving a portion 50 of the physical scalar register file for temporary variables this can tend to increase the lifetime for which the temporary variables remain in the physical register file 15, so that it is more likely that there can be sharing of temporary variables across different instances of gather-load or scatter-store instruction when they share the same vector source operand.

Figure 4:
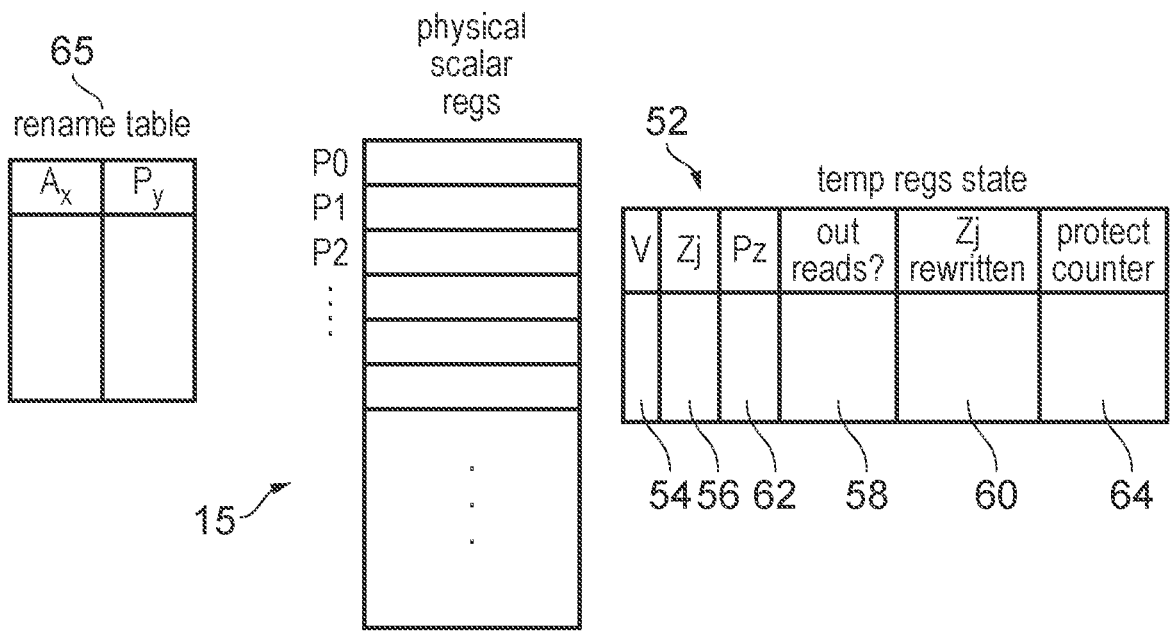
FIG. 4 shows an alternative example in which a common set of registers is shared for both scalar operands and temporary data transferred from the vector register file and the rename stage protects temporary registers used to store data transferred from the vector register file for a period to prevent the physical register being reallocated a different architectural register.

FIG. 4 shows another alternative where, instead of reserving particular registers as temporary registers, the entire register file 15 can be mapped either as temporary registers, or as architectural registers (which are mapped to particular architectural register specifiers which can be specified by the instructions decoded by the decode stage 10). The rename stage 12 may maintain a rename table 65 for tracking the correspondence between architectural register specifiers and the physical registers in the scalar register file 15 (note that such a rename table 65 may also be provided in the example of FIG. 3, but in FIG. 3 the rename table may only be mapped to the physical scalar registers 15 other than the temporary registers 15). In addition, the scalar rename engine 17 may maintain the temporary register state table 52 similar to that of FIG. 3, but in addition to fields 56 to 60, with the example of FIG. 4 the temporary register state may also include an indication 62 of the particular physical register of the scalar register 15 that is mapped to storing the temporary variable associated with a given vector register Zj, and may also include a protection counter 64 which is used to track how long the data in a given temporary register should be retained before it can be reallocated to be remapped to a different architectural register specifier. The use of the fields 54, 56, 58, 60 may be the same as in FIG. 3 except that when allocating a new temporary register then the physical register identifier of the allocated register is written to field 62 and the protect counter 64 may be set to some initial value and may be triggered to start counting for some period of time. The contents of a given temporary register tracked in the temporary register state 52 may be protected from reallocation until not only the number of outstanding reads is zero but also the protection counter 64 has expired. The size of the protection counter may be selected so that it is likely that the period over which the counter expires is longer than the period expected to take to process all of the micro-operations associated with the gather-load or scatter-store instruction. This may make it more likely that the temporary variables can be held in a physical register file for a period long enough to increase the probability of multiple gather-load or scatter-store instructions storing the same temporary variable so that unnecessary register move micro-operations can be suppressed or omitted.

It will be appreciated that the format of the register tracking state 52 shown in FIGS. 3 and 4 is just one example, and other implementations could use a different approach to track which registers hold temporary variables, and determine whether they can be reused for later instructions.

In one example implementation, in a CPU implementing two different vector and general purpose (scalar) register files (VRF, GRF) with separate renaming engines, the address generation units used for load and store instructions may only have access to the GRF. Some instructions may need some micro-operations (uops) to transfer data between VRF and GRF. For example, the Gather Load and Scatter Store instructions usually need lots of uops to transfer data in a whole vector register to a general purpose (scalar) register, which will serve as a base address or offset for a memory transaction. Those register move uops will occupy slots in issue queue so that the pipe might be stalled, will occupy limited bandwidth of data transfer between the VRF and GRF, and will consume lots of power.

Figure 5:
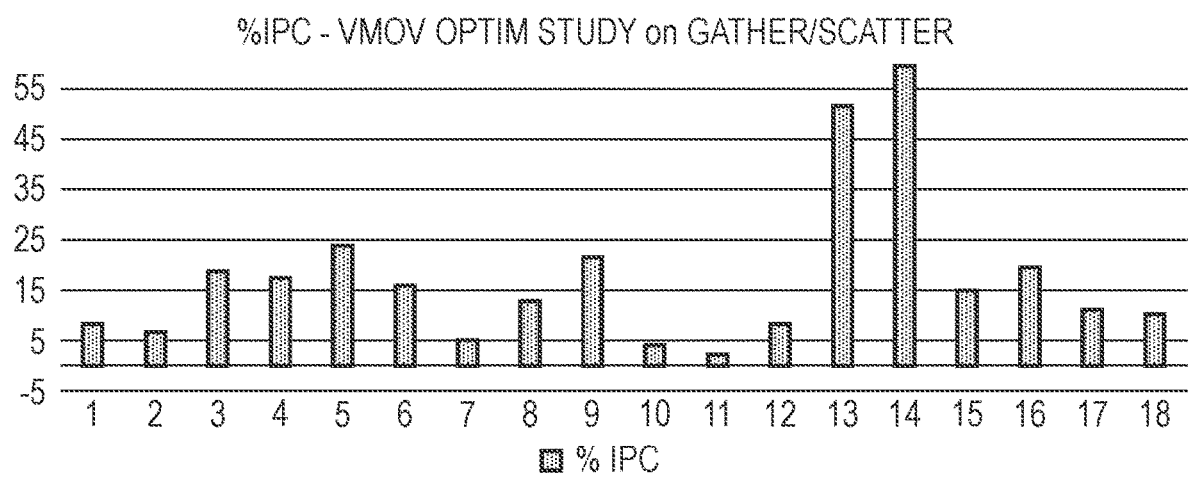
FIG. 5 is a graph showing the relative performance improvement that can be achieved for different processing benchmarks when register move operations are suppressed for gather/scatter load/store instructions sharing the same address operands.

However, we find that sometimes the values transferred by 2 or more instructions are the same during the execution of those instructions. For example, one vector register might be used as memory address offset by more than one Gather Load and Scatter Store instructions, and there may be no instructions writing that register during the period between the instructions, which means the register value remains the same. This means it is not necessary to transfer the same value from VRF to GRF again and again. From lots of workloads we studied, it is a reasonably common case. Taking Gather Load and Scatter Store instructions for example, there are nearly 50% instructions in our workloads using an offset vector register with unchanged value which is the same as at least one other instruction. By removing those redundant register move uops, we could achieve better performance. FIG. 5 shows the percentage improvement of number of instructions executed per cycle (% IPC) that can be reached on some representative tests (different processing benchmarks labelled 1 to 18). This improvement is better than 10% IPC for some tests. The performance uplift is mostly due to fewer stalls in issue queue caused by too many uops and lower requirements for data transfer bandwidth between core and vector units. Considering the high frequency that the optimization occurs for Gather Load and Scatter Store instructions, the power consumed by extra logic used for detecting the condition when the redundant register move uops can be omitted is lower than the power that would be consumed by the redundant register move uops. Thus, we could save power as well by applying this technique to frequently occurring cases.

Hence, the renaming circuitry may check for register move uops created by temporary-register-using instructions, such as Gather Load and Scatter Store instructions. The temporary register written by those uops may be protected for a certain period in the GRF. This period could be chosen and refreshed according to several different factors, such as total number of protected temporary registers in GRF, the last time the protected register is used, etc. When rename finds another register move uop created by a temporary-register-using instruction reads the same vector register and its value remains unchanged, for example no instructions re-writing this architectural register, the rename stage will remove this uop and directly rename destination register as the protected temporary register. By doing this, the redundant register move uops could be removed from later execution.

In the specific example above, the technique for eliminating register move micro-operations is applied to gather-load or scatter-store instructions. However, the same technique could be applied to other types of load/store instructions for which the address is computed based on data from the vector register file 60. In general the technique could be applied for any operation which requires an address to be computed based on information from the vector register file 16, where the address generation unit 32 is restricted to calculating its addresses directly based on the scalar register file 15.

Also, the same technique can be used for other types of temporary-register-using instructions, which require register move micro-operations to transfer data from a first register file to a second register file, where a temporary register not mapped to any particular architectural register specifier is used to store the temporary variable in the second register file and could potentially be reused by a later instruction of a similar type which specifies the same source operand in the first register file (when there has not been any intervening instruction for rewriting that source operand from the first register file).

For example, in a similar way to the address generation unit 52, in some examples the encryption or error detecting code calculation unit 34 could only accept input from one of the register files 15, 16 and may not be able to directly process operands in the other register file, and so may require some register move micro-operations. If the types of instructions which require this execution unit 34 share the same input operands, they can be processed more efficiently if the second of these instructions can reuse the temporary variable already within a given register file rather than needing to execute a second register move operation to transfer the same variable from the other register file for a second time.

Another example may be a mixed vector/scalar multiply-add instruction for calculating R=A*B+C, where A and R are vectors, one of B and C is specified as a scalar and the other of B and C is specified as a vector. Although such an instruction could be processed faster in vectorised execution units, in some implementations it may be considered more important to reduce power consumption even if this means performance is reduced, and so some implementations may choose to process such an instruction in scalar execution units instead of the vectorised execution units. Therefore, such an instruction could in some implementations require a register move micro-operation to transfer an operand between the vector and scalar register files, so if two instructions specify the same source register then the register move micro-operation for the second instruction could be omitted if no intervening instruction has rewritten the source register.

Figure 6:
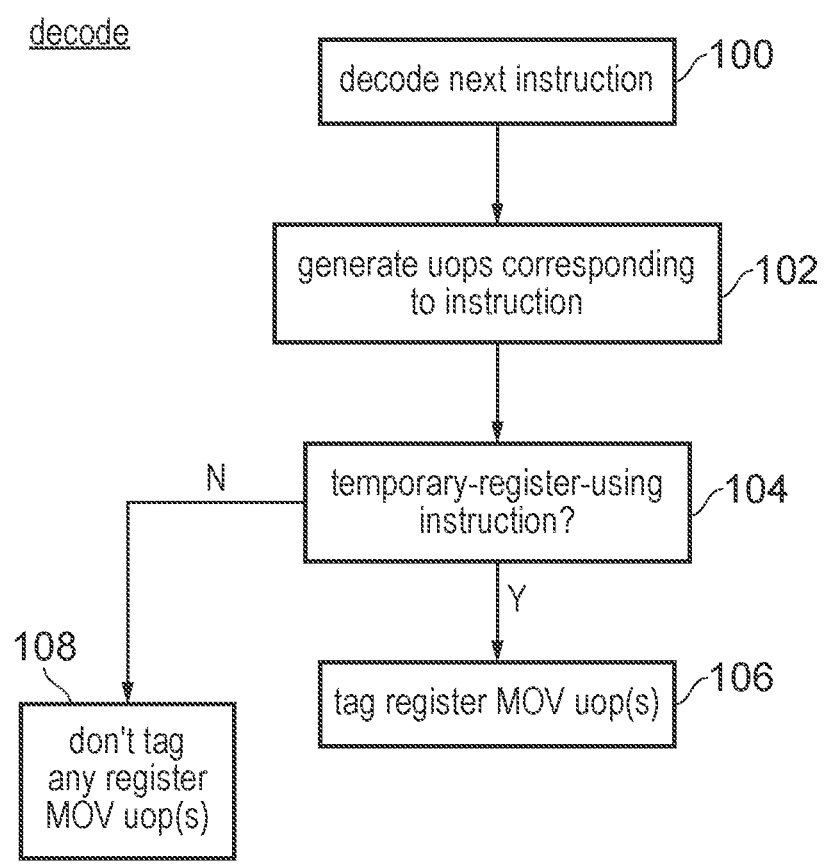
FIG. 6 is a flow diagram showing operations at the decode stage to tag register move micro-operations associated with temporary-register-using instructions.
Figure 7:
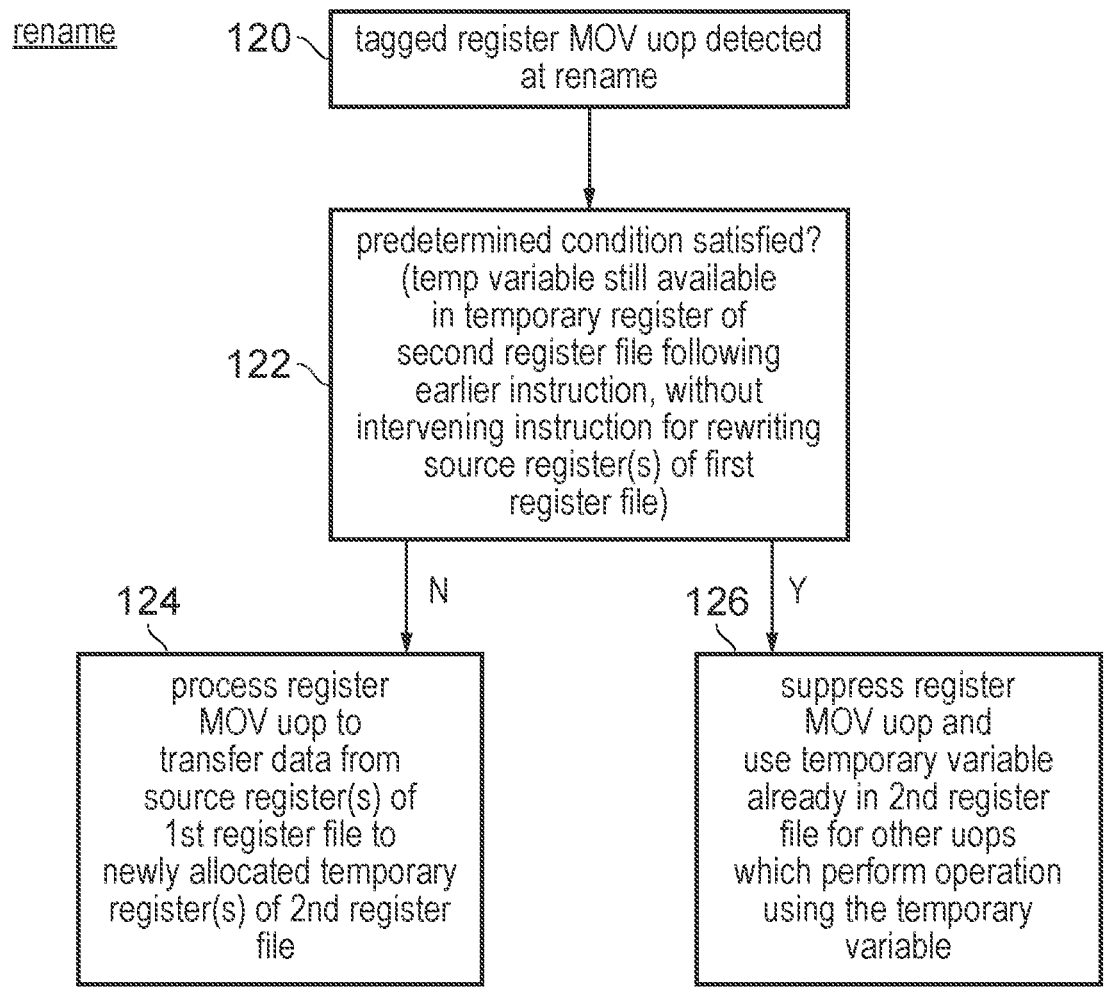
FIG. 7 is a flow diagram showing steps performed at the rename stage to identify whether a register move micro-operation should be processed.

Hence, in general this technique can be used for any temporary-register-using instruction which requires an operation to be performed using a source operand in a first register file and would normally need that operand to be transferred to a second register file temporarily before the operation can be performed. The gather-load and scatter-store instructions discussed above are just some examples of that type of instruction. FIGS. 6 and 7 are flow diagrams showing operations at the decode and rename stages 10, 12 for handling such instructions.

As shown in FIG. 6, at step 100 the decode stage 10 may decode the next program instruction fetched by the fetch stage 6. At step 102 the decode stage 10 generates one or more micro-operations corresponding to the particular type of instruction that was decoded. At step 104 the decode stage determines whether the detected instruction was a temporary-register-using instruction, such as the gather-load or scatter-store instruction or the instructions involving encryption or error detection code calculation as discussed above. If so, then any register move micro-operations associated with that instruction are tagged with an indicator which distinguishes them from other types of register move micro-operations. If the instruction was not a temporary-register-using instruction then at step 108 any generated register move micro-operations are not tagged with the indicator (or for some instruction there may not in fact be any register move micro-operations generated in response to that type of instruction). Any micro-operations generated by the decode stage 10 are then passed to rename stage 12 for renaming.

FIG. 7 is a flow diagram showing the operation of the rename stage 12. For micro-operations other than those tagged by the decode stage 10 the rename stage 12 may process those micro-operations according to any known technique. For the tagged register move micro-operations, when such a register move micro-operation is detected at the rename stage 12 at step 120, in response at step 122 the register rename stage 12 detects, based on the temporary register state 52, whether a predetermined condition is satisfied for the particular tagged register move micro-operation which was detected. The condition to be checked is whether the temporary variable required for the corresponding micro-operation is still available in a temporary register of a second register file (e.g. the scalar register file 15) following an earlier instruction, without any intervening instruction for rewriting the relevant source registers of the first register file having been detected. For example, in the specific case of FIGS. 3 and 4 the rename stage may check the rewrite counter 60 and the value of the vector register field 56 to check whether there is an entry for which both the vector register indication 56 matches the vector register specified by the register move micro-operation detected at step 120, and the rewrite field 60 indicates that there has been no intervening instruction which could have rewritten that source vector.

If at step 122 the predetermined condition was not satisfied then at step 124 the register move micro-operation is processed as normal, to transfer data from one or more source registers of the first register file (e.g. the vector register file 16) to one or more newly allocated registers of the second register file (e.g. the scalar register file 15). These newly allocated temporary registers may be previously invalid registers, or previously valid temporary registers which are able to be reclaimed if there are no longer any outstanding reads and any protection count 64 has expired.

On the other hand, if at step 122 the predetermined condition was satisfied then at step 126 the tagged register move micro-operation is supressed, and is not passed to subsequent stages of the pipeline so that it will not occupy any slots in the issue queue 21 or the execute units 22. This also saves bandwidth and save power in the register transfer path between the respective register files 15, 16. The temporary variable already stored in the second register file (within the temporary register corresponding to the entry of the temporary register state storage which held the matching source vector register indication 56) may be used to process other micro-operations which need the temporary variable from that register, such as the address generation micro-operations shown in FIG. 2.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a processing pipeline to perform data processing operations in response to micro-operations generated based on decoding of instructions;
a first register file; and
a second register file; in which:
one of the first register file and the second register file comprises a scalar register file comprising scalar registers to store scalar operands;
the other of the first register file and the second register file comprises a vector register file comprising vector registers to store vector operands; and
in response to a temporary-register-using instruction for controlling the processing pipeline to perform at least one operation using a temporary variable derived from at least one operand stored in at least one source register of the first register file, the processing pipeline is configured to:
detect whether a predetermined condition is satisfied, the predetermined condition comprising the temporary-register-using instruction being detected as following an earlier temporary-register-using instruction specifying the same at least one source register for determining the temporary variable, in the absence of an intervening instruction for rewriting the at least one source register of the first register file, when the temporary variable for the earlier temporary-register-using instruction is still available in at least one temporary register of the second register file;

when the predetermined condition is detected to be not satisfied, process at least one register move micro-operation to transfer data from the at least one source register of the first register file to at least one newly allocated temporary register of the second register file; and when the predetermined condition is detected to be satisfied, perform the at least one operation using the temporary variable stored in the at least one temporary register used for the earlier temporary-register-using instruction.

2. The apparatus according to claim 1, in which when the predetermined condition is detected to be satisfied, the processing pipeline is configured to omit processing of the at least one register move micro-operation.

3. The apparatus according to claim 1, comprising:
scalar register renaming circuitry to map architectural scalar register specifiers specified by the instructions to physical scalar register specifiers directly identifying the scalar registers of the scalar register file; and
vector register renaming circuitry separate from the scalar register renaming circuitry, to map architectural vector register specifiers specified by the instructions to physical vector register specifiers directly identifying the vector registers of the vector register file.

4. The apparatus according to claim 1, in which the processing pipeline comprises register renaming circuitry to map architectural register specifiers specified by the instructions to physical register specifiers.

5. The apparatus according to claim 4, in which each of said at least one temporary register comprises a register not currently mapped to any architectural register specifier specifiable by the instructions.

6. The apparatus according to claim 4, in which the register renaming circuitry is configured to detect whether the predetermined condition is satisfied.

7. The apparatus according to claim 6, in which:
the processing pipeline comprises decode circuitry to decode the instructions to generate the micro-operations;
the decode circuitry is configured to tag a register move micro-operation generated in response to the temporary-register-using instruction with a tag indication, to distinguish from a register move micro-operation generated in response to an instruction other than the temporary-register-using instruction; and
in response to a register move micro-operation tagged with the tag indication, the register renaming circuitry is configured to detect whether the predetermined condition is satisfied, and to suppress processing of the at least one register move micro-operation when the predetermined condition is detected to be satisfied.

8. The apparatus according to claim 4, in which, following processing of the at least one register move micro-operation to transfer data from the at least one source register of the first register file to the at least one temporary register, the register renaming circuitry is configured to protect said at least one temporary register from being remapped to a new architectural register specifier for a period after processing of the at least one register move micro-operation.

9. The apparatus according to claim 8, in which the period has a longer duration than a duration taken to complete processing of any micro-operations associated with the temporary-register-using instruction.

10. The apparatus according to claim 1, in which the second register file comprises at least one reserved temporary register reserved for storing data transferred from the first register file in response to a temporary-register-using instruction.

11. The apparatus according to claim 1, comprising at least one calculation unit capable of performing a calculation based on an operand stored in the second register file and incapable of performing a calculation based on an operand stored in the first register file.

12. The apparatus according to claim 11, in which the temporary-register-using instruction comprises an instruction for which the calculation performed by the at least one calculation unit is required to be applied to an operand specified in the at least one source register of the first register file.

13. The apparatus according to claim 11, in which the at least one calculation unit comprises an address calculation unit to calculate addresses for data access operations based on one or more operands stored in the second register file.

14. The apparatus according to claim 11, in which the at least one calculation unit comprises at least one of:
an encryption unit to perform an encryption operation on an operand stored in the second register file; and
an error detection code calculating unit to calculate an error detection code based on an operand stored in the second register file.

15. The apparatus according to claim 1, in which the first register file comprises a vector register file comprising a plurality of vector registers, the second register file comprises a scalar register file comprising a plurality of scalar registers; and
the temporary-register-using instruction comprises a data access instruction for controlling the processing pipeline to access data from a memory system according to at least one address which depends on a source vector operand stored in a source vector register specified by the temporary-register-using instruction.

16. The apparatus according to claim 15, in which the data access instruction comprises a gather-load instruction or scatter-store instruction for controlling the processing pipeline to process a plurality of data access operations to a plurality of addresses in memory, each data access operation having its address depending on a respective data element of the source vector operand of the data access instruction.

17. The apparatus according to claim 16, in which each data element of the source vector operand specifies one of:
a base address, to be combined with an offset specified by a scalar operand or immediate operand to form the address of the corresponding data access operation, where the scalar operand or the immediate operand is the same for each of the plurality of data access operations; or
an offset, to be combined with a base address specified in a scalar operand to form the address of the corresponding data access operation, where the scalar operand is the same for each of the plurality of data access operations.

18. An apparatus comprising:
means for performing data processing operations in response to micro-operations generated based on decoding of instructions;
first register file means for storing data; and
second register file means for storing data; in which:
one of the first register file means and the second register file means comprises a scalar register file comprising scalar registers to store scalar operands;
the other of the first register file means and the second register file means comprises a vector register file comprising vector registers to store vector operands; and
in response to a temporary-register-using instruction for controlling the means for performing data processing operations to perform at least one operation using a temporary variable derived from at least one operand stored in at least one source register of the first register file means, the means for performing data processing operations is configured to:
  detect whether a predetermined condition is satisfied, the predetermined condition comprising the temporary-register-using instruction being detected as following an earlier temporary-register-using instruction specifying the same at least one source register for determining the temporary variable, in the absence of an intervening instruction for rewriting the at least one source register of the first register file, when the temporary variable for the earlier temporary-register-using instruction is still available in at least one temporary register of the second register file;
  when the predetermined condition is detected to be not satisfied, process at least one register move micro-operation to transfer data from the at least one source register of the first register file to at least one newly allocated temporary register of the second register file; and
  when the predetermined condition is detected to be satisfied, perform the at least one operation using the temporary variable stored in the at least one temporary register used for the earlier temporary-register-using instruction.

19. A data processing method comprising:
in response to a temporary-register-using instruction for controlling a processing pipeline to perform at least one operation using a temporary variable derived from at least one operand stored in at least one source register of a first register file:
  detecting whether a predetermined condition is satisfied, the predetermined condition comprising the temporary-register-using instruction being detected as following an earlier temporary-register-using instruction specifying the same at least one source register for determining the temporary variable, in the absence of an intervening instruction for rewriting the at least one source register of the first register file, when the temporary variable for the earlier temporary-register-using instruction is still available in at least one temporary register of a second register file, wherein one of the first register file and the second register file comprises a scalar register file comprising scalar registers to store scalar operands, and the other of the first register file and the second register file comprises a vector register file comprising vector registers to store vector operands;
  when the predetermined condition is detected to be not satisfied, processing at least one register move micro-operation to transfer data from the at least one source register of the first register file to at least one newly allocated temporary register of the second register file; and
  when the predetermined condition is detected to be satisfied, performing the at least one operation using the temporary variable stored in the at least one temporary register used for the earlier temporary-register-using instruction.

* * * * *